(12) United States Patent
Nagata

(10) Patent No.: US 7,309,078 B2
(45) Date of Patent: Dec. 18, 2007

(54) VEHICLE WITH CURTAIN AIR BAG

(75) Inventor: Yoshitaka Nagata, Anjo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 450 days.

(21) Appl. No.: 10/811,936

(22) Filed: Mar. 30, 2004

(65) Prior Publication Data
US 2004/0188985 A1    Sep. 30, 2004

(30) Foreign Application Priority Data
Mar. 31, 2003  (JP)  ............................. 2003-095837
Mar. 31, 2003  (JP)  ............................. 2003-095838

(51) Int. Cl.
*B60R 21/20* (2006.01)
(52) U.S. Cl. ................. 280/728.2; 280/730.2
(58) Field of Classification Search ............ 280/730.2, 280/728.2, 808, 801.2; B60R 22/24
See application file for complete search history.

(56) References Cited

U.S. PATENT DOCUMENTS

| 2002/0125696 A1 | 9/2002 | Amamori |
| 2002/0175504 A1 | 11/2002 | Tanase et al. |
| 2003/0006592 A1* | 1/2003 | Yasuhara et al. ........ 280/730.2 |

FOREIGN PATENT DOCUMENTS

| DE | 4206232 A1 | 9/1992 |
| DE | 69717593 T2 | 10/2003 |
| EP | 1209043 A1 | 5/2002 |
| EP | 1 227 014 A2 * | 7/2002 |
| JP | 2002-264762 A | 9/2002 |

* cited by examiner

*Primary Examiner*—Ruth Ilan
(74) *Attorney, Agent, or Firm*—Birch, Stewart, Kolasch & Birch, LLP (57) ABSTRACT

A vehicle with a curtain air bag includes a roof side rail of the vehicle, the curtain air bag being mounted along said roof side rail, and a seat belt anchor fastened together with the curtain air bag on the roof side rail.

10 Claims, 7 Drawing Sheets

PRIOR ART

Fig.7 ing parts 61, the curtain air bag 57 is fixed to the roof side rail 56 via fastening members 62 such as bolts to endure the reaction caused by the intake of high-pressure gas during deployment.

Figure 6:
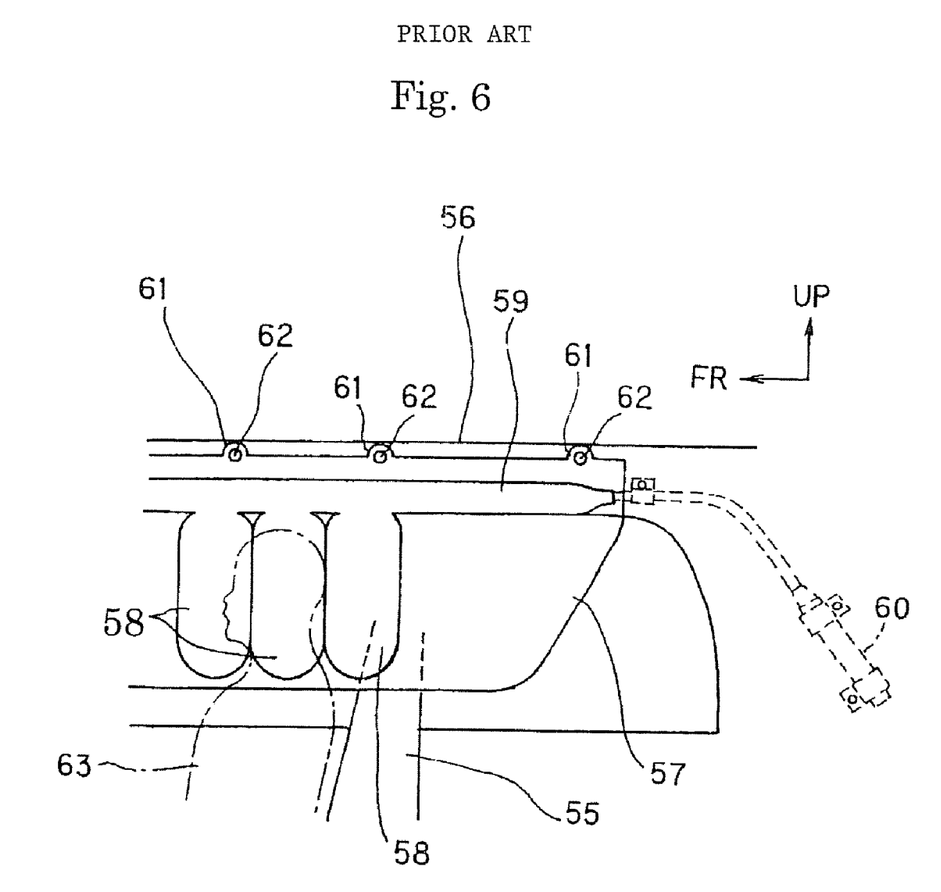
FIG. 6 is a view schematically showing the structure of a curtain air bag.
Figure 7:
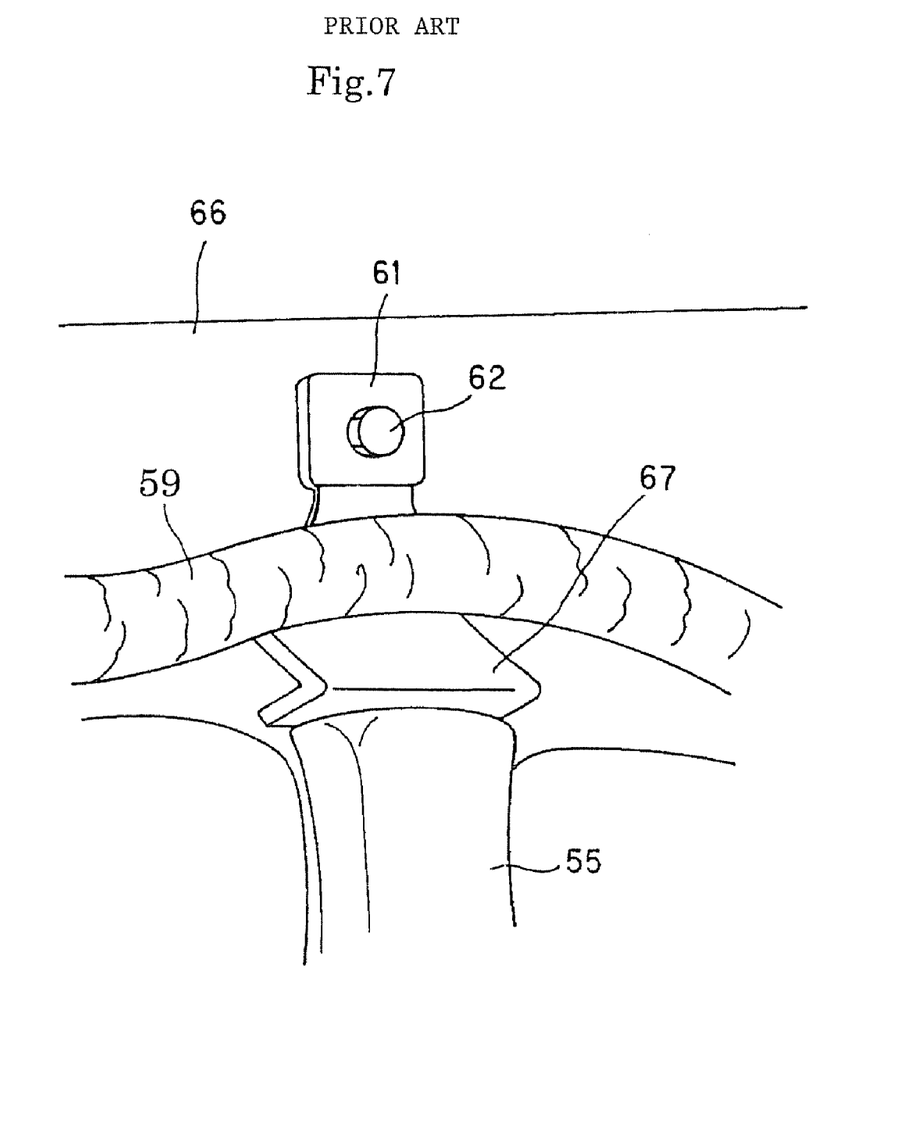
FIG. 7 is a view schematically showing the curtain air bag installed on a roof side rail as viewed from the inside of the vehicle.

FIG. 7 is a view schematically showing the curtain air bag installed on the roof side rail as viewed from the inside of the vehicle. FIG. 7 shows a part of the curtain air bag, where there is no inflating part, the curtain air bag being comprised of the gas intake passage 59 installed along the roof side rail, and a plurality of inflating parts (refer to the inflating parts 58 appearing in FIG. 6) installed at regular intervals in the gas intake passage 59.

As shown in FIG. 7, the curtain air bag mounting part 61 is fixed to a roof side rail inner 66, which constitutes the vehicle inner side of the roof side rail, via the fastening member 62 such as a bolt, so that the curtain air bag can be installed on the roof side rail. When the curtain air bag is in a stowed condition, the gas intake passage 59 is stored in a roof side trim, not shown, in the state of being retracted along the roof side rail 56.

On this occasion, an obstacle such as the center pillar 55 lies below the curtain air bag in the inflating direction thereof, the curtain air bag may not be smoothly deployed. For this reason, a rising bracket is additionally disposed between the curtain air bag and the obstacle so that the air bag can be smoothly deployed. FIG. 7 shows an example where a center pillar rising bracket 67 is disposed for the center pillar 55 as the obstacle.

The seat belt and the curtain air bag as above can be typically used as devices for protecting the occupant, but in the case where both the seat belt anchor and the curtain air bag are installed on the roof side rail, the following problem arises.

Specifically, the seat belt anchor 52b is installed on the roof side rail 56, and the curtain air bag 57 (mounting parts 57) is fixed on the roof side rail 56 at a plurality of locations and in the direction of the length of the vehicle, and further, the rising bracket is disposed where necessary. This complicates the inner side of the roof side rail, restricts locations where parts are mounted, and increases the man-hour for assembly (refer to Japanese Laid-Open Patent Publication (Kokai) No. 2002-264762)

Further, if the seat belt anchor 52b is installed on the roof side rail 56, and the curtain air bag 57 (mounting parts 61) is installed along the roof side rail 56 and in the direction of the length of the vehicle, the gas intake passage 59 inflated by the inflow of gas from the inflator 60 and the seat belt anchor 52b interfere with each other in the event of air bag deployment. Consequently, the seat belt anchor 52a inhibits the gas intake passage 59a from sufficiently inflating, and the flow of gas in the gas intake passage 59b as well as the flow of gas into the inflating parts 58 cannot be realized at a sufficient speed, and therefore, the curtain air bag cannot be smoothly deployed.

VEHICLE WITH CURTAIN AIR BAG

CROSS-REFERENCE TO RELATED APPLICATIONS

This application incorporates by reference the subject matter of Application NO. 2003-095837 and 2003-095838 filed in Japan on 31 Mar. 2003, on which a priority claim is based under 35 U.S.C § 119(a).

BACKGROUND OF THE INVENTION

1. Field of the Invention

The present invention relates to a vehicle provided with a curtain air bag.

2. Description of the Related Art

Figure 5A:
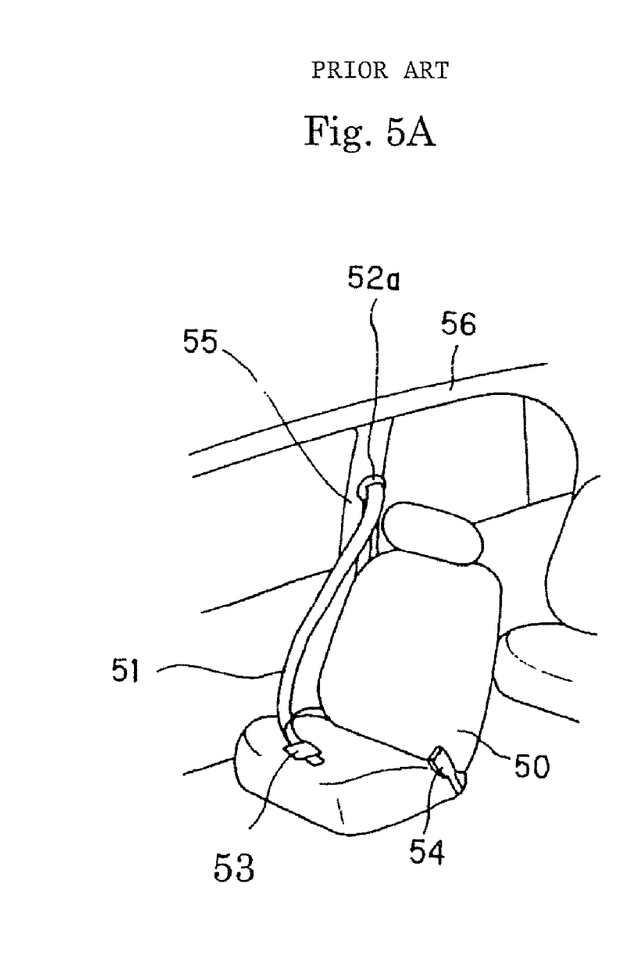
FIGS. 5A to 5B are views schematically showing the inside of a vehicle.

FIG. 5A is a view schematically showing the inside of a vehicle, around a seat installed within the vehicle. As shown in FIG. 5A, a seat 50 on which the occupant is to be seated, and a seat belt 51 for protecting the occupant from, e.g., a car accident, are installed within the vehicle.

The seat belt 51 in FIG. 5A is a lap and diagonal belt, which is installed together with a seat belt anchor 52a and a seat belt retractor (belt windup device), not shown, within the vehicle. The occupant seated on the seat 50 inserts a tongue 53 into a buckle 54 to fasten the seat belt 51 so that the occupant can be secured on the seat 50.

Figure 5B:
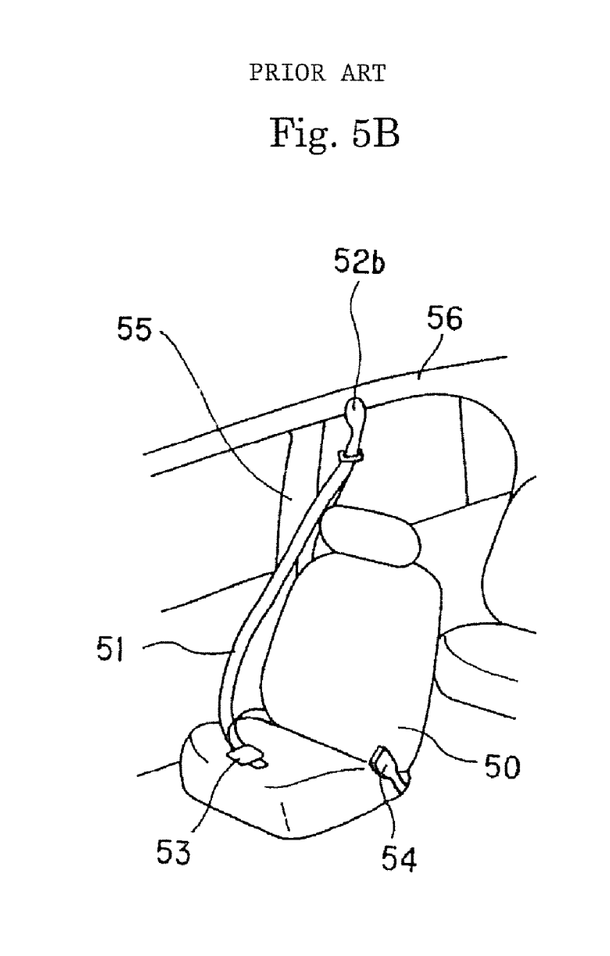

In recent years, vehicles of the type that a seat belt anchor 52b is fixed to a roof side rail 56 as shown in FIG. 5B have become more common as compared with vehicles of the type that the seat belt anchor 52a is fixed to a center pillar 55 as shown in FIG. 5A. In the case where the seat belt anchor 52b is fixed to the roof side rail 56, the seat belt anchor 52b is fixed at a location of the roof side rail 56, which is at the rear of the center pillar 55.

The location of the seat belt anchor has been changed as described above for the following reason. In the case of the type that the seat belt anchor 52a is fixed to the center pillar 55 located substantially on the side of the occupant, a gap is formed between the seat belt 51 and the occupant seated on the seat 50 when the seat 50 is moved rearward along the length of the vehicle, and hence the occupant may not be sufficiently secured, whereas in the case of the type that the seat belt anchor 52b is fixed to a location of the roof side rail 56, which is at the rear of the occupant, the occupant can be sufficiently secured without being affected by the movement of the seat 50.

An air bag as well as the seat belt can be used as a device which protects the occupant from, e.g., a car accident. In particular, a curtain air bag installed on the side of the vehicle serves as an occupant protective device for protecting the occupant from impact applied to the side of the vehicle.

FIG. 6 is a view schematically showing the structure of the curtain air bag in a deployed condition. If impact is applied to the side of the vehicle, gas ejected from an inflator 60 flows into a gas intake passage 59 constituting the curtain air bag (FIG. 6 shows the curtain air bag 57 in a deployed condition) stowed along the roof side rail 56. The gas which has flown into the gas intake passage 59 having a substantially linear shape, inflates a plurality of inflating parts 58, causing the curtain air bag 57 to be deployed over the whole of the side of the seated occupant 63, so that the occupant 63 can be protected from the impact applied to the side of the vehicle.

Mounting parts 61 are protruded at predetermined intervals from the upper edge of the curtain air bag 57. At the

SUMMARY OF THE INVENTION

It is therefore an object of the present invention to provide a vehicle with a curtain air bag, which can be installed together with a seat belt anchor on a roof side rail.

To attain the above object, there is provided a vehicle with a curtain air bag, which includes a roof side rail of the vehicle, the curtain air bag mounted along the roof side rail, and a seat belt anchor fastened together with the curtain air bag on the roof side rail.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE PRESENT INVENTION

Figure 1:
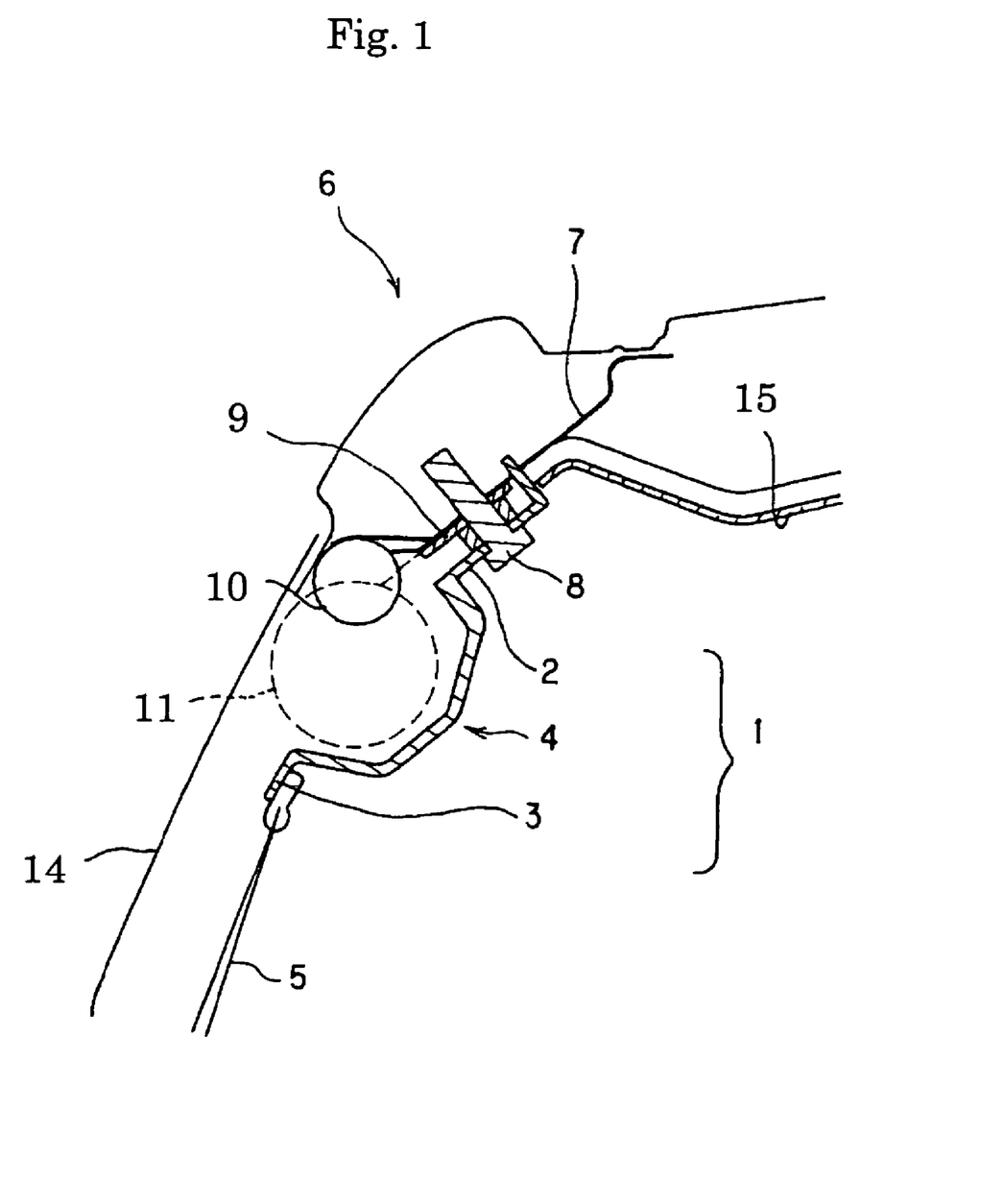
FIG. 1 is a sectional view schematically showing the mounting structure of an air bag and a seat belt anchor according to a first embodiment of the present invention.
Figure 2:
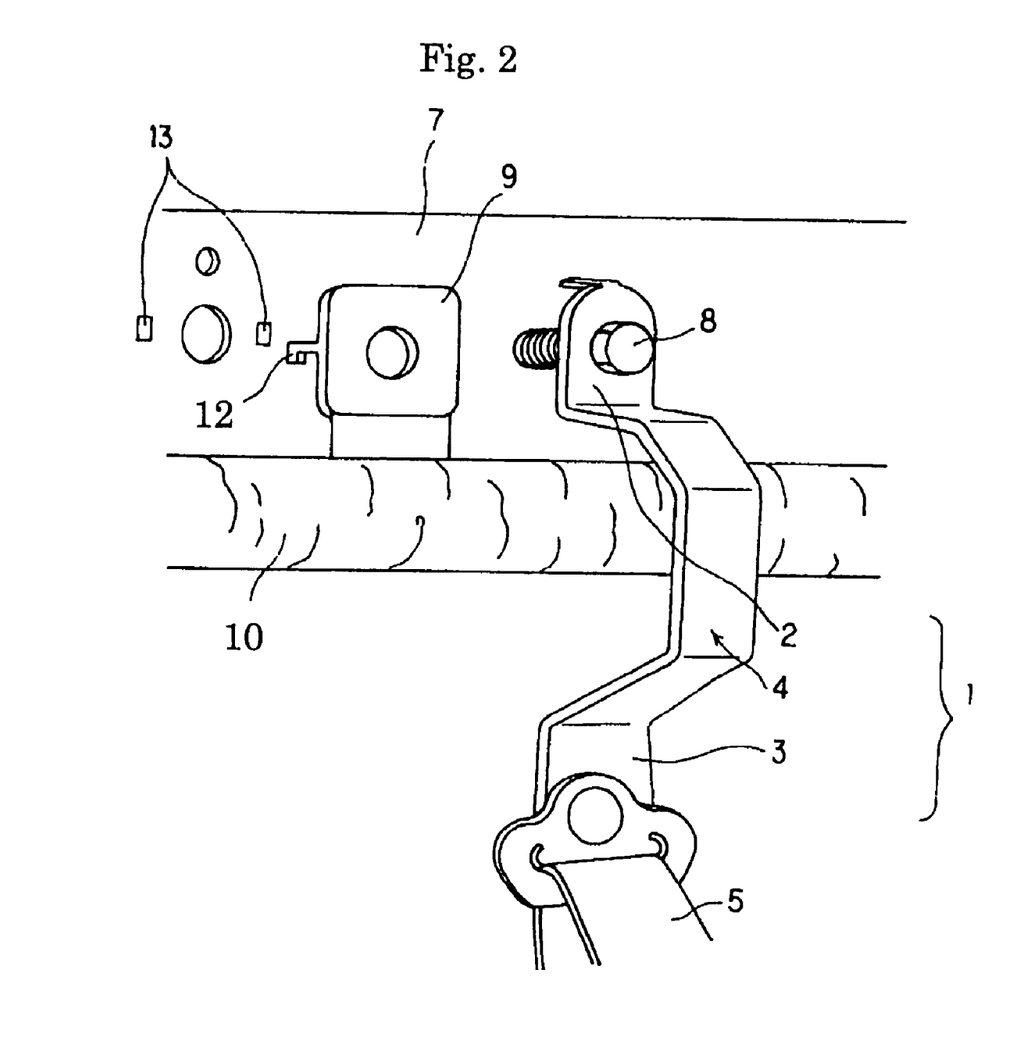
FIG. 2 is a perspective view schematically showing the mounting structure of the air bag and the seat belt anchor in FIG. 1.

FIG. 1 is a sectional view schematically showing the mounting structure of an air bag and a seat belt anchor according to a first embodiment of the present invention. FIG. 2 is a perspective view schematically showing the mounting structure in FIG. 1, and showing the state in which the air bag and the seat belt anchor are fixed to a roof side rail.

As shown in FIGS. 1 and 2, the seat belt anchor 1 has one end thereof provided with a fixed part 2 which is fixed to a roof side rail inner 7 constituting a roof side rail 6, and has the other end thereof provided with a belt connecting part 3 to which a seat belt 5 is connected. Between the fixed part 2 and the belt connecting part 3, there is provided a gas intake passage avoiding part 4 (protruded part) which is bow-shaped to be curved inward in the vehicle to avoid a gas intake passage 11 which is inflated when the curtain air bag is deployed.

The fixed part 2 of the seat belt anchor 1 is fixed to the roof side rail inner 7 via a fastening member 8. On this occasion, a curtain air bag mounting part 9 is temporarily fastened in advance on the roof side rail inner 7 by inserting a temporary fastening claw 12 formed in the mounting part 9 into a temporary fastening hole 13 formed in the roof side rail inner 7, and then the mounting part 9 and the fixed part 2 of the seat belt anchor 1 are fastened together by the fastening member 8.

In the case where the curtain air bag mounting part 9 is disposed in the vicinity of the seat belt anchor 1 as shown in FIGS. 1 and 2, the mounting part 9 and the seat belt anchor 1 are fastened together at one location. This eliminates the problems that locations where parts are to be mounted are restricted and the man-hour for assembly is increased due to the complicated structure of the inner side of the roof side rail 6.

Further, since the curtain air bag mounting part 9 is fixed to the roof side rail inner 7 constituting the roof side rail 6 via the fastening member 8, the curtain air bag is installed on the roof side rail 6, and a gas intake passage 10 is stored in a roof side trim, not shown, in the state of being retracted along the roof side rail 6 when the curtain air bag is in a stowed condition.

When the curtain air bag is deployed, the gas intake passage 10 is greatly inflated as is the case with the gas intake passage 11 appearing in FIG. 1 due to the pressure of gas which is flown from an inflator, and this accelerates the deployment of the curtain air bag. On this occasion, in the present embodiment, since the gas intake passage avoiding part 4 of the seat belt anchor 1 is protruded inward in the vehicle, and hence the gas intake passage 11 can be sufficiently inflated without interfering with the seat belt anchor 1 when the curtain air bag is deployed.

Specifically, the flow of gas in the gas intake passage 11 and the flow of gas into inflating parts are not inhibited by the seat belt anchor 1 fixed to the roof side rail 6. Consequently, the gas intake passage 11 causes gas to flow into the inflating parts at a sufficient speed, making it possible to smoothly deploy the curtain air bag.

Further, the location of the belt connecting part 3 of the seat belt anchor 1 is substantially the same as the location of a conventional corresponding part, and lies in proximity to a side window glass 14. Therefore, the seat belt 5 does not overhang inward in the vehicle, and never deteriorates the interior comfort of the vehicle and narrows the range of vision.

It should be noted that the seat belt anchor 1 according to the present embodiment is adapted to be protruded at the gas intake passage avoiding part 4. Therefore, to ensure the same stiffness as that of a conventional seat belt anchor which has a substantially linear shape, it is desirable that the gas intake passage avoiding part 4 is shaped to be extended in proximity to and along the periphery of the gas intake passage 11. Alternatively, a metal plate forming the seat belt anchor 1 may be formed to be thicker than that of a conventional art.

Although the seat belt anchor 1 according to the present embodiment includes the bow-shaped gas intake passage avoiding part 4, the present invention is not limited to this. The seat belt anchor 1 may have a substantially linear shape and can be fastened together with an air bag mounting part on the roof side rail inner 7. In this case, a hinge or a tether is interposed between the fastened part 2 and the belt connecting part 3 of the seat belt anchor 1 so that the seat belt anchor 1 can rotate inward in a vehicle compartment. Therefore, even if the seat belt anchor 1 has a substantially linear shape, the flow of gas in the gas intake passage 11 and the inflow of gas into the inflating parts are not inhibited by the seat belt anchor 1 when the curtain air bag is deployed, and as a result, the curtain air bag can be smoothly deployed.

Figure 3:
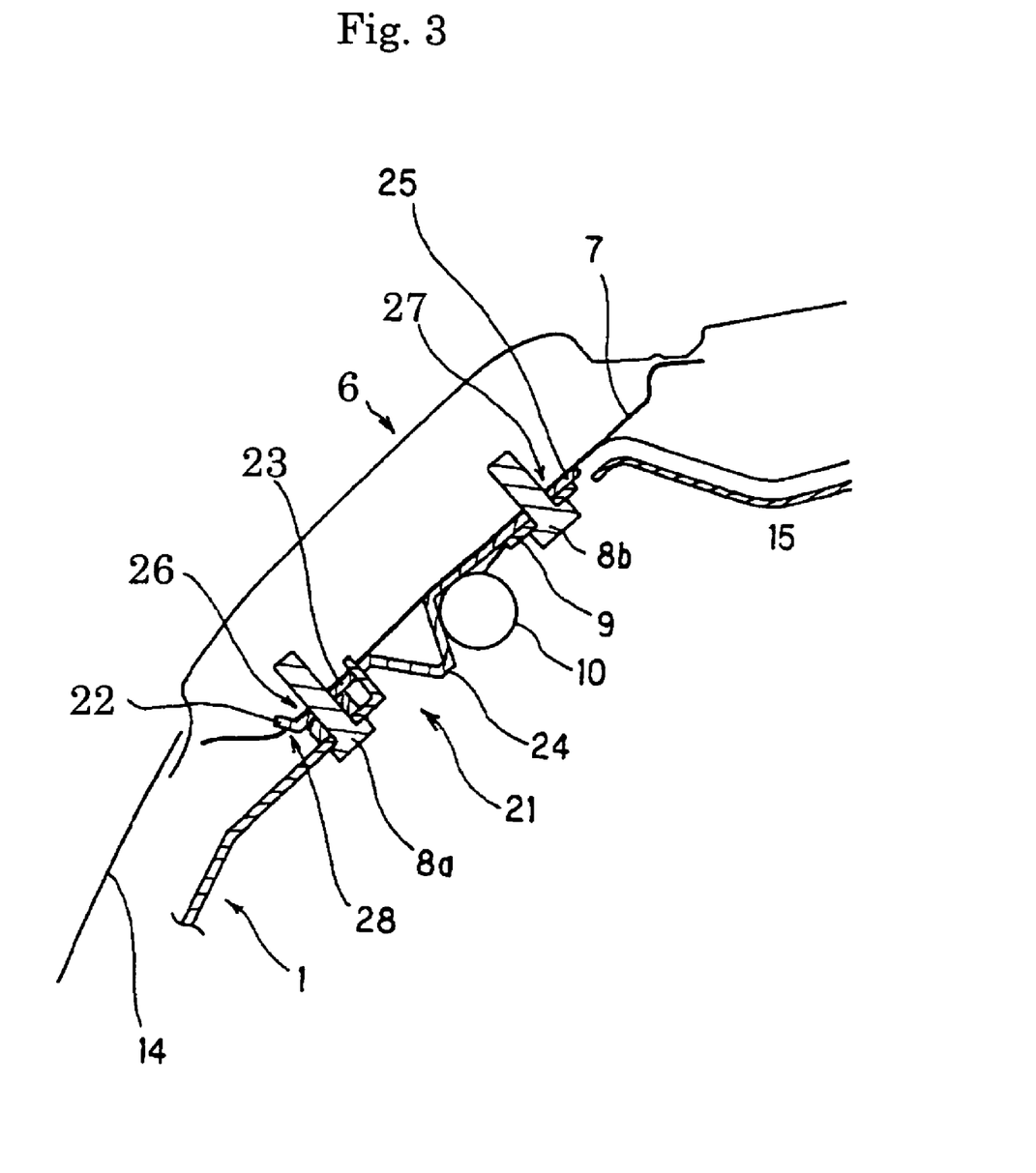
FIG. 3 is a sectional view schematically showing the mounting structure of an air bag and a seat belt anchor according to a second embodiment of the present invention.
Figure 4:
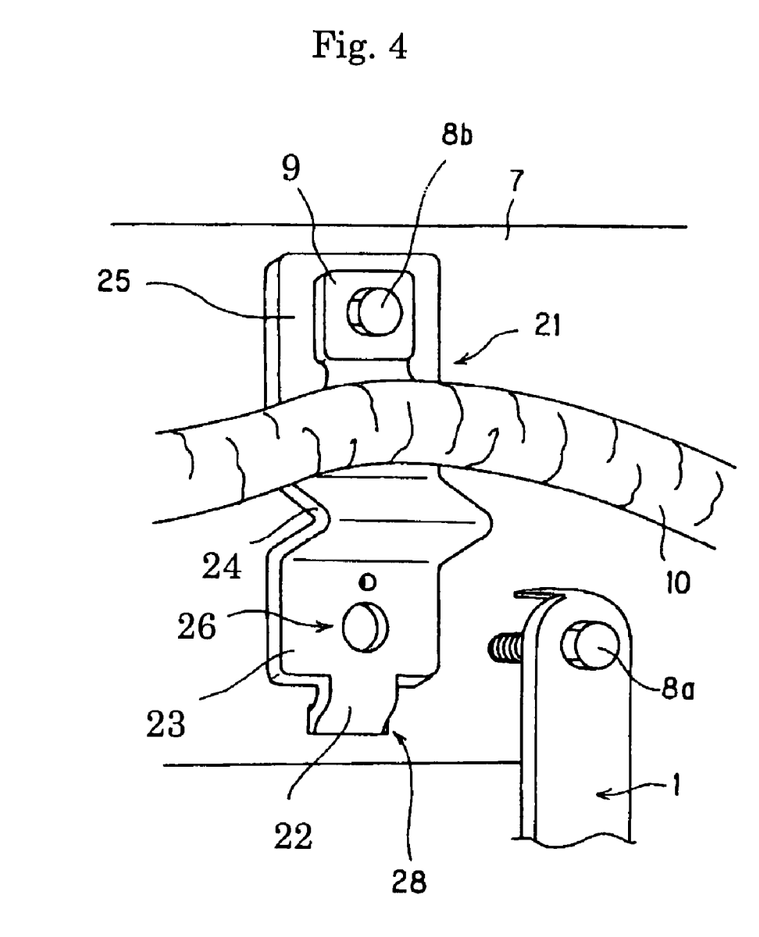
FIG. 4 is a perspective view schematically showing the mounting structure of the air bag and the seat belt anchor in FIG. 3.

FIG. 3 is a sectional view schematically showing the mounting structure of an air bag and a seat belt anchor according to a second embodiment of the present invention. FIG. 4 is a perspective view schematically showing the mounting structure in FIG. 3, and showing the state in which the air bag and the seat belt anchor are fixed to a roof side rail.

As shown in FIGS. 3 and 4, a mounting bracket 21 is made of one rectangular metal plate, and a mountain-shaped rising part 24 is formed substantially at the center of the metal plate. An insertion part 22 and a seat belt anchor mounting part 23 are provided at one end of the metal plate, and an air bag mounting part 25 is provided at the other end.

The insertion part 22 is shaped such that it is bent in a direction opposite to the protruding direction of the rising part 24, and then bent to be parallel with the body of the metal plate again. The seat belt anchor mounting part 23 corresponds to a part between the insertion part 22 and the rising part 24, and is provided with a fastening hole 26 for fastening the seat belt anchor 1.

The air bag mounting part 25 is provided at the other end of the metal plate, which is different from the one end at which the insertion part 22 and the seat belt anchor mounting part 23 are provided, and is provided with a fastening hole 27 for fastening the air bag mounting part 9.

After the insertion part 22 of the mounting bracket 21 is inserted into a fastening hole 28 formed in the roof side rail inner 7, the air bag mounting part 25 of the mounting bracket 21 and the air bag mounting part 9 are fastened together on the roof side rail inner 7 via a fastening member 8*b*. Further, the seat belt anchor mounting part 23 of the mounting bracket 21 and the seat belt anchor 1 are fastened together on the roof side rail inner 7 via a fastening member 8*a*.

In the case where the curtain air bag mounting part 9 is disposed in the vicinity of the seat belt anchor 1 as shown in FIGS. 3 and 4, the mounting part 9 and the seat belt anchor 1 are integrally fastened by the mounting bracket 21. This eliminates the problem that locations where parts are mounted are restricted and the man-hour for assembly is increased due to the complicated inner side of the roof side rail.

Further, since the mounting bracket 21 is provided with the rising part 24 which enables the curtain air bag to be smoothly deployed while avoiding an obstacle located in the deploying direction of the curtain air bag, a rising bracket does not have to be additionally provided. Although no obstacle is illustrated in FIGS. 3 and 4, it is assumed, for example, that a plastic trim which covers the seat belt anchor 1 is an obstacle. Since the mounting bracket 21 is provided with the rising part 24, the number of parts can be further reduced, and the assembly process can be simplified.

It should be noted that the mounting part 9 may be fixed in advance to the air bag mounting part 25 of the mounting bracket 21 by, e.g., welding, and temporarily fastened by a simple clip or the like in place of the fastening member 8*b*, and finally at the seat belt anchor mounting part 23, the seat belt anchor 1 may be fixed on the roof side rail inner 7 by the fastening member 8*a*.

This is because the air bag mounting part 25 is formed integrally with the seat belt anchor mounting part 23 by one metal plate, and hence if the seat belt anchor mounting part 23 as well as the seat belt anchor 1 is fixed to the roof side rail inner 7, the curtain air bag can be fixed as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A safety device of a vehicle having a curtain air bag stowed along a roof side rail of the vehicle, comprising:
    a mounting bracket to which the curtain air bag is attached and adapted to be attached to the roof side rail and for supporting a seatbelt anchor, such that the mounting bracket underpasses the curtain air bag between the roof side rail and the curtain air bag, the mounting bracket having a rising member that allows deployment of the curtain air bag away from an obstacle provided in a deploying direction of the curtain air bag; and
    a mounting part adapted to support the curtain air bag on the roof side rail,
    wherein the mounting part and the mounting bracket are attached to the roof side rail as a unit.

2. The safety device of claim 1, wherein the curtain air bag is located above the rising member.

3. A safety device of a vehicle having a curtain air bag stowed along a roof side rail of the vehicle, comprising:
    a mounting bracket adapted to be attached to the roof side rail and for supporting a seatbelt anchor such that the mounting bracket underpasses the curtain air bag between the roof side rail and the curtain air bag, the mounting bracket having a rising member that allows deployment of the curtain air bag away from an obstacle provided in a deploying direction of the curtain air bag;
    wherein the mounting bracket and the seat belt anchor are attached to the roof side rail by a common fastening member.

4. A safety device of a vehicle having a curtain air bag stowed along a roof side rail of the vehicle, comprising:
    a mounting bracket adapted to be attached to the roof side rail and for supporting a seatbelt anchor such that the mounting bracket underpasses the curtain air bag between the roof side rail and the curtain air bag, the mounting bracket having a rising member that allows deployment of the curtain air bag away from an obstacle provided in a deploying direction of the curtain air bag; and
    a mounting part adapted to support the curtain air bag on the roof side rail,
    wherein the mounting part and the mounting bracket are attached to the roof side rail as a unit, and
    wherein the mounting part and the mounting bracket are attached to the roof side rail by a common fastening member.

5. A safety device of a vehicle having a curtain air bag stowed along a roof side rail of the vehicle, comprising:
    a mounting bracket adapted to be attached to the roof side rail and for supporting a seatbelt anchor such that the mounting bracket underpasses the curtain air bag between the roof side rail and the curtain air bag, the mounting bracket having a rising member that allows deployment of the curtain air bag away from an obstacle provided in a deploying direction of the curtain air bag,
    wherein the mounting bracket has a first end thereof provided with an insertion portion inserted into a fastening hole provided in the roof side rail and a second end thereof fixed to the roof side rail, and the rising member is formed between the first end and the second end.

6. The safety device of claim 5, wherein the mounting bracket has a seatbelt anchor mounting part provided between the rising member and the second end for supporting the seatbelt anchor.

7. The safety device of claim 5, further comprising:
    a mounting part adapted to support the curtain air bag on the roof side rail,
    wherein the mounting bracket has an air bag mounting part provided between the first end arid the rising member, and the mounting part is attached to the roof side rail with the mounting bracket by a common fastening member.

8. A safety device of a vehicle having a curtain air bag stowed along a roof side rail of the vehicle, comprising:
    a mounting bracket adapted to be attached to the roof side rail and for supporting a seatbelt anchor and the curtain air bag, the mounting bracket adapted to extend from a position higher than the curtain air bag to a position lower than the curtain air bag when attached to the roof side rail.

9. The safety device of claim 8, wherein the mounting bracket is provided with a rising member that allows deployment of the curtain air bag away from an obstacle provided in a deploying direction of the curtain air bag, the rising member is provided at a position lower than an air bag mounting part for supporting the curtain air bag.

10. The safety device of claim 9, wherein the air bag mounting part is positioned above the curtain air bag when the mounting bracket is attached to the roof side rail.

* * * * *